(12) United States Patent
Mueller et al.

(10) Patent No.: US 8,928,194 B2
(45) Date of Patent: Jan. 6, 2015

(54) DRIVE MODULE WITH DECOUPLING ELEMENT

(75) Inventors: Andreas Mueller, Eberdingen (DE); Andreas Schiel, Gernsbach-Lautenbach (DE); Harald Eisenhardt, Rutesheim (DE); Matthias Ludwig, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 370 days.

(21) Appl. No.: 13/391,390

(22) PCT Filed: Jul. 6, 2010

(86) PCT No.: PCT/EP2010/059602
§ 371 (c)(1),
(2), (4) Date: May 7, 2012

(87) PCT Pub. No.: WO2011/020645
PCT Pub. Date: Feb. 24, 2011

(65) Prior Publication Data
US 2012/0212110 A1 Aug. 23, 2012

(30) Foreign Application Priority Data
Aug. 20, 2009 (DE) .......................... 10 2009 028 745

(51) Int. Cl.
*H02K 5/24* (2006.01)
*F04D 29/66* (2006.01)
*F04D 25/06* (2006.01)
*F04D 29/42* (2006.01)
*H02K 7/14* (2006.01)

(52) U.S. Cl.
CPC .......... *F04D 29/668* (2013.01); *F04D 25/0613* (2013.01); *F04D 29/4226* (2013.01); *H02K 5/24* (2013.01); *H02K 7/14* (2013.01)
USPC ........................................... 310/51; 310/414

(58) Field of Classification Search
CPC ...................................................... H02K 5/24
USPC .................... 310/51, 414, 415, 423
See application file for complete search history.

(56) References Cited

U.S. PATENT DOCUMENTS

| | | | |
|---|---|---|---|
| 5,537,810 A | 7/1996 | Paweletz | |
| 2004/0012289 A1* | 1/2004 | Gross et al. | 310/91 |
| 2005/0200211 A1* | 9/2005 | Hsu et al. | 310/51 |
| 2008/0143198 A1* | 6/2008 | Bi et al. | 310/51 |
| 2008/0296985 A1* | 12/2008 | Fukuno et al. | 310/51 |

FOREIGN PATENT DOCUMENTS

| | | |
|---|---|---|
| CN | 101304198 | 11/2008 |
| JP | 200169717 | 3/2001 |
| JP | 2008301622 | 12/2008 |
| WO | 00/36730 | 6/2000 |

OTHER PUBLICATIONS

PCT/EP2010/059602 International Search Report dated Oct. 26, 2010 (2 pages).

* cited by examiner

*Primary Examiner* — Michael Andrews
(74) *Attorney, Agent, or Firm* — Michael Best & Friedrich LLP

(57) ABSTRACT

The invention relates to a drive module, particularly for a fan in a motor vehicle, comprising a drive motor having a stator, at least one vibration-dampening decoupling element, and a fastening flange connected to the stator of the drive motor by the decoupling element, wherein the decoupling element is arranged in the interior of the stator and the fastening flange comprises a supporting element that is engaged in the decoupling element.

25 Claims, 4 Drawing Sheets

DRIVE MODULE WITH DECOUPLING ELEMENT

The invention relates to a drive module; in particular, the invention relates to a drive module for a fan in a motor vehicle.

Drive modules are standardized assemblies which can be handled separately and can be used universally. One field of use of a drive module of this type is a fan system in a motor vehicle, in which a fan is arranged between an intake section for fresh air and a distributor section for delivered air. A fan of this type can be constructed with the aid of a drive module, with the result that an installation and dismantling time of the fan is minimized and, in addition, accessibility of components which are situated in the adjacent sections, for example of a heat exchanger or a heater, is improved.

In drive modules in general and in a drive module for use in a fan, in particular, decoupling of the drive motor from its surroundings with regard to vibrations of every type is frequently required, in order to minimize solid-borne sound and vibrations which fatigue material. Elastic decoupling elements are usually used for decoupling purposes, such as steel springs. Usual decoupling requires additional installation space, for instance in the axial direction of a side facing the output or in a radial direction of the drive module. As a consequence of this, the resulting drive module is larger and less flexible in terms of its use.

SUMMARY OF THE INVENTION

The invention is based on the object of specifying an arrangement of vibration-damping decoupling elements on a drive module, which arrangement is advantageous with regard to function and installation space.

According to a first aspect, a drive module, in particular for a fan in a motor vehicle, comprises a drive motor with a stator, at least one vibration-damping decoupling element, and a fastening flange which is connected via the decoupling element to the stator of the drive motor, the decoupling element being arranged in the interior of the stator and the fastening flange having a supporting element which is in engagement with the decoupling element.

As a result, positioning of the decoupling elements in the axial direction behind the drive motor or radially outside the drive motor can be avoided, as a result of which the drive module can be of more compact construction.

A plurality of decoupling elements can be arranged radially symmetrically about the rotational axis of the drive motor along a circumference. As a result, a space within the stator can be used advantageously, which space would otherwise not be usable for components of the drive module. As a result of the given arrangement, the guidance of a concentric shaft or axle of the drive motor is not impaired.

The decoupling element can be configured as a hollow cylinder which comprises a radial inner face which is in engagement with the supporting element and a radial outer face which is in engagement with the stator. For example, the decoupling element can be configured in the form of an elongate sleeve, with the result that it can also transmit comparatively great forces, as can occur, for example, in the case of a small spacing of the decoupling elements from the rotational axis of the drive motor.

The stator can comprise a first and a second holder, each holder mounting the decoupling element in an axial direction. The decoupling element can thus already be fixed permanently on the stator before the latter is fastened to the fastening flange. In addition, the decoupling element can be configured in such a way that it is connected to the two holders of the stator by means of a frictional connection, with the result that handling of the stator in the context of a production process is simplified. In addition, each holder can bear in the radial direction against the decoupling element.

On a side which faces the fastening flange, the supporting element can have a shoulder which bears axially against the decoupling element. As a result, a minimum spacing can be defined between the stator and the fastening flange.

On a side which faces away from the fastening flange, the supporting element can carry a securing element which bears axially against the decoupling elements. The securing element can ensure rapid single-use mounting. As a result, for example, the stator which comprises the decoupling element can be pushed in a single work operation onto the axial supporting element of the fastening flange and can be secured there on the supporting element by way of a securing element. This arrangement also permits decoupling of vibrations of the stator from the fastening flange in the axial direction.

The stator can be enclosed by a rotor of the drive motor. In an arrangement of this type with outer rotor, a particularly highly integrated drive module can be realized as a result of the given arrangement of the decoupling elements on the inner side of the stator.

The fastening flange can define an outer contour of the drive module in the radial direction. As a result, a section of the drive module can be introduced through a fixing or mounting opening of a fastening structure in such a way that the fastening flange subsequently closes the opening and mounts the drive module in the opening. The fastening flange can have further elements, in order, for example, to form a closure with the surrounding structure or an airtight or watertight closure with regard to this structure, for instance a seal, a supporting ring and/or locking elements. Moreover, the fastening flange can comprise, for example, an electric connector element for the drive motor, for example a plug or a socket.

According to a second aspect, a fan module comprises a drive module with a drive motor with outer rotor and a fan wheel which is connected to the outer rotor. The fan wheel can be formed in such a way that the drive motor largely fills the space which is defined by the fan wheel, with the result that the fan module is particularly compact. In particular, the fan wheel can have a semi-axial construction with a concave boundary which faces the drive motor.

According to a third aspect, a motor vehicle comprises a fan system having the fan module as described above. The particularly compact construction of the fan module results, for example, in a greater structural scope for other elements of the motor vehicle.

BRIEF DESCRIPTION OF THE DRAWINGS

In the following text, the invention will be described in greater detail with reference to the appended drawings, in which.

DETAILED DESCRIPTION

Figure 1:
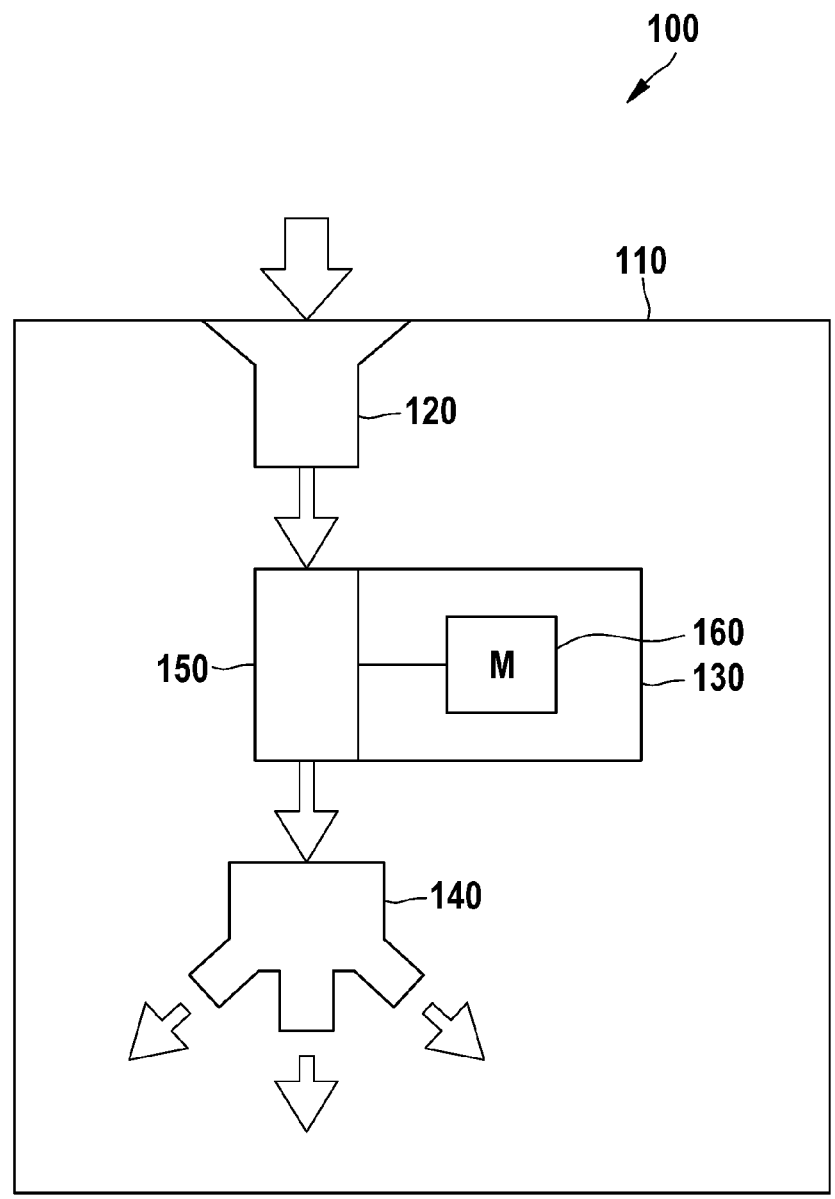
FIG. 1 shows a diagrammatic illustration of a fan system in a motor vehicle.

FIG. 1 shows a diagrammatic illustration of a motor vehicle fan system 100. A motor vehicle 110 comprises an intake section 120, a fan module 130 and a distributor section 140. The fan module 130 comprises a fan wheel 150 and a drive module 160. Optional elements of the motor vehicle fan system 100 are not contained in the illustration of FIG. 1, such as filters, flaps, valves, heat exchangers, condensers and the like which are not further relevant in the present context. The drive module 160 sets the fan wheel 150 in rotation, with the result that air is sucked into the fan wheel 150 from an outer side of the motor vehicle 110 through the intake section 120 and is subsequently conveyed through the distributor section 140 to the inside of the motor vehicle 140. A use of the fan module 130 in a ventilation system outside a motor vehicle 110 is likewise possible.

The intake section 120 and the distributor section 140 are frequently configured jointly in a common section. The fan module 130 can be capable of being inserted into the intake section 120, the distributor section 140 or the integrated section in the manner of a cartridge. In the surroundings of the fan module 130, the relevant section can have an element which converts a radial flow direction of air which flows out of the fan wheel 150 into a linear flow direction, for example a pressure increasing spiral which additionally brakes and compresses the air which flows away from the fan wheel 150.

Figure 2:
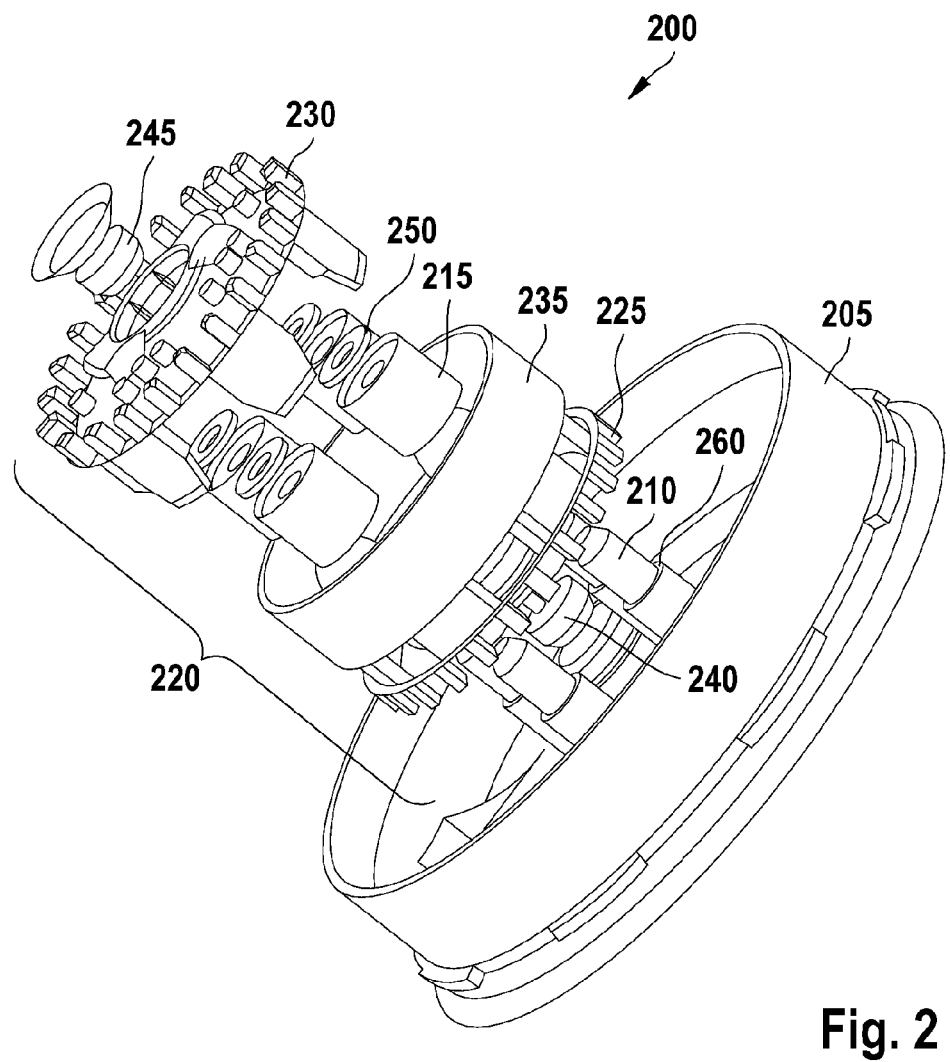
FIG. 2 shows an isometric view of an exploded illustration of part of the drive module from FIG. 1.

FIG. 2 shows an isometric illustration of an exploded drawing of a part 200 of the drive module 160. The part 200 which is shown comprises a fastening flange 205 with four axial supporting elements 210 and a stator 220 which can be coupled to the fastening flange 205 by means of four elastic decoupling elements 215. The decoupling elements 215 are composed of an elastic material which preferably has high internal damping, for example silicone or rubber. The stator 220 comprises a first holder 225 and a second holder 230, a first magnetic flux element 235, a lower rotary bearing 240, an upper rotary bearing 245 and securing elements 250. The supporting elements 210 have shoulders 260.

The stator 220 is configured in such a way that it can be mounted on the fastening flange 205 as a unit which can be handled separately. To this end, the first flux element 235 and the four decoupling elements 215 are inserted between the first holder 225 and the second holder 230 at the correspondingly provided positions, before the first holder 225 is connected to the second holder 230. When the first holder 225 and the second holder 230 are connected to one another, the decoupling elements 215 and the first flux element 235 are delimited in each case in the axial direction on both sides by the two holders 225 and 230. A clamping action which fixes the two holders 225 and 230 against one another is induced by a frictional connection between the outer circumference of the decoupling elements 215 and the corresponding radial receptacles of the lower holder 225 and the upper holder 230. Furthermore, there is a frictional connection between the inner circumference of the first magnetic flux element 235 and the holders 225 and 230. Fixed in this way, a winding (or coils) can be applied to the stator 220, which winding comprises a number of conductor sections which extend in the axial direction along the circumferences of the holders 225 and 230. These wire pieces can be fixed by means of the projections of the holders 225 and 230, which projections extend in the axial direction. Together with the first magnetic flux element 235 (also called short-circuit plate or flux plate), the windings can form coils or electromagnets for magnetic coupling to a rotor which encloses the stator 220.

The lower rotary bearing 240 and the upper rotary bearing 245 are connected in a rotationally stable manner to the first holder 225 and the second holder 230 and are configured for receiving an axle or shaft which is connected to the stator. In an alternative embodiment, one or both of the bearings 240 and 245 can also be of rotatable configuration with regard to the holders 225, 230 which surround them.

Figure 3:
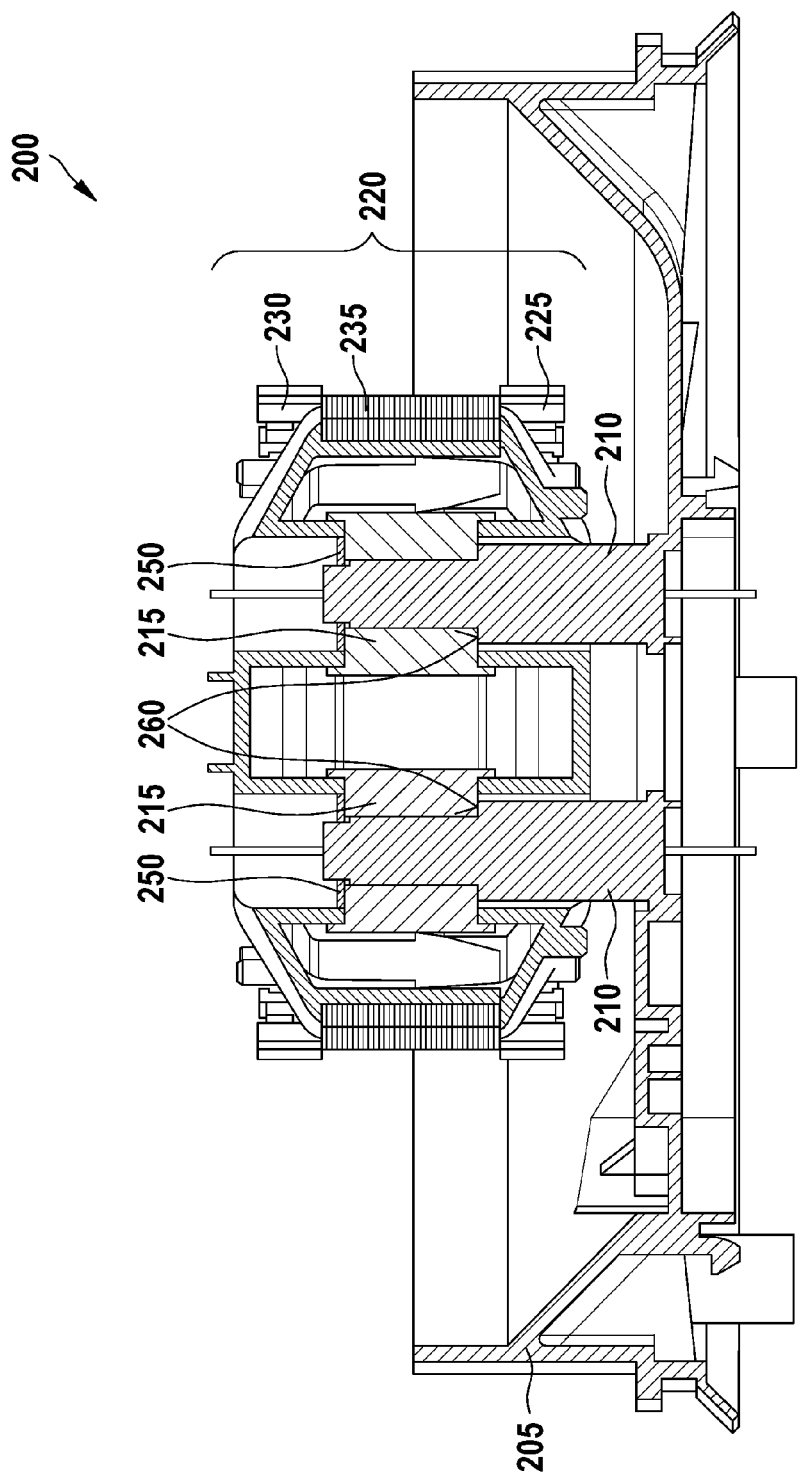
FIG. 3 shows a sectional view of the mounted part from FIG. 2.

FIG. 3 shows a lateral sectional view of the mounted part 200 of the drive module 160 from FIG. 2. The lower rotary bearing 240 and the upper rotary bearing 245 are not shown. The approximately hollow-cylindrical decoupling elements 215 bear on their inner circumference in a positively locking manner against the supporting elements 210. The decoupling elements 215 are fixed in the axial direction downward by shoulders 260 in the axial supporting elements 210 and upward by means of the securing elements 250 on the supporting elements 210. The securing elements 250 can be, for example, self-locking securing rings. As an alternative to this, the securing elements 250 can be pressed, for example, onto an end section of the supporting element 210 or the latter can be fit into them. To this end, the end sections of the supporting elements 210 can be shaped conically. In a further embodiment, the securing elements 250 are connected non-positively to the supporting elements 210, for example, by means of adhesive bonding, welding, remelting, brazing, screwing or a further known connection method.

The decoupling element 215 has in each case coaxial recesses on its two end faces in the axial direction, into which coaxial recesses hollow-cylindrical engagement elements of the first holder 225 and the second holder 230 of the stator 220 engage, with the result that the decoupling element 215 is fixed both in the radial and in the axial direction with respect to the stator 220.

The axial supporting element 210 is configured in one piece with the fastening flange 205, a multiple-piece construction also being possible in an alternative embodiment. The supporting element 210 has a radial spacing from the first holder 225. The magnitude of the spacing defines a maximum compression travel of the decoupling element 215 when the stator 220 is deflected with respect to the fastening flange 205. A great spacing also assists absorption of pronounced vibrations, but at the same time allows a relatively great deflection of the stator 220 with respect to the fastening flange 205, with the result that the position of the stator or of an element which is connected to it is defined less precisely.

The radial contact of the securing element 250 with the second holder 230 of the stator 220 is optional. The first magnetic flux element 235 is formed by a number of rings made from a softly magnetic material which are stacked on one another. Alternative embodiments, for example in the form of a single-piece or multiple-piece cylinder or a spiral, are likewise possible.

Figure 4:
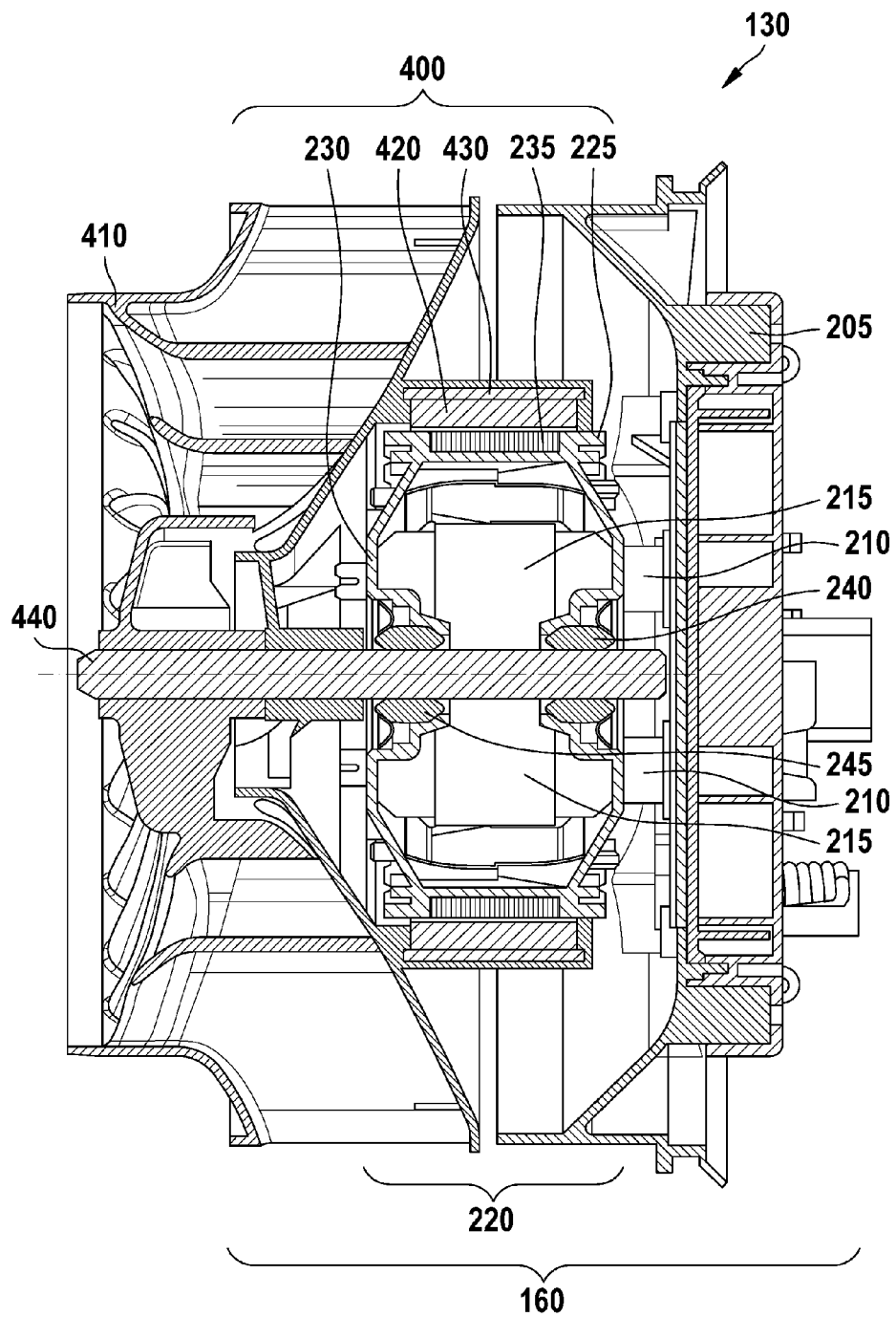
FIG. 4 shows a sectional view of a fan module using the mounted part from FIG. 3.

FIG. 4 shows a lateral sectional view of a fan module 130 using the drive module 160 of FIG. 1 which comprises the part 200 of FIGS. 2 and 3. In addition to the drive module 160, the fan module 130 comprises a fan wheel 410, permanent magnets 420, a second magnetic flux element 430 and an axle 440. In the selected illustration, the supporting elements 210 and the elastic decoupling elements 215 are shown from outside, that is to say in a non-sectioned state. For the sake of clarity, no coils are shown on the stator 220 either. The fan module 160 is universally suitable for use in fan systems 120, 130, 140, the high space utilization with simultaneously satisfactory vibration damping particularly favoring use in a motor vehicle 110.

The fan wheel 410 is of the semi-axial type, that is to say it comprises fan blades for sucking in air from the axial direction (from the left) and fan blades for discharging the air which has been sucked in the radial direction. The fan wheel 410 is connected to the drive module 160 by means of the axle 440. The axle 440 is fastened fixedly to the fan wheel 410 so as to rotate with it, for example by being molded on, being cast on, being pressed in, being adhesively bonded, being welded or being fit. A rotor 400 of the drive module 160 is formed by the permanent magnets 420 and the second magnetic flux element 430 which are attached fixedly to the fan wheel 410 so as to rotate with it. The second magnetic flux element 430 produces a magnetic flux on an outer circumference of the permanent magnets 420 which are arranged in the manner of a ring.

The axle 440 can be secured at its end which faces the fastening flange 205 against sliding out of the lower rotary bearing 240. This securing means can be accessible, for example, by a corresponding mounting opening (not shown) in the fastening flange 205, in order for it to be possible to disconnect the fan wheel 410 from the drive module 200 as required. As an alternative to this, the axle 440 can be secured in the axial direction by means of a non-releasable connection against sliding out of the lower rotary bearing 240, for example by means of a securing ring which has been pressed on or fit, a circlip or another element with a comparable effect.

The fastening flange 205 is dimensioned in such a way that, on its right hand side, it fills a mounting opening, through which the fan wheel 410 can pass. The mounting opening can be situated on an air section of the motor vehicle 110 from FIG. 1 and can be, for example, circular.

What is claimed is:

1. A drive module (160), comprising:
   a drive motor with a stator (220) having an interior;
   at least one vibration-damping decoupling element (215) that facilitates decoupling of at least two components in the drive module (160); and
   a fastening flange (205) which is connected via the decoupling element (215) to the stator (220) of the drive motor;
   characterized in that the decoupling element (215) is arranged in the interior of the stator (220) and the fastening flange (205) has a plurality of supporting elements (210), wherein at least one of the plurality of supporting elements is in engagement with the decoupling element (215); and
   wherein the fastening flange 205 is formed as a single piece.

2. The drive module (160) as claimed in claim 1, characterized in that a plurality of decoupling elements (215) are arranged radially symmetrically about a rotational axis of the drive motor along a circumference.

3. The drive module (160) as claimed in claim 2, characterized in that the decoupling element (215) is configured as a hollow, elastic cylinder which comprises a radial inner face which is in engagement with the supporting element (210) and a radial outer face which is in engagement with the stator (220).

4. The drive module (160) as claimed in claim 3, characterized in that the stator (220) comprises a first (225) and a second holder (230), the decoupling element (215) being fastened in a positively locking manner between the two holders (225, 230).

5. The drive module (160) as claimed in claim 4, characterized in that, on a side which faces the fastening flange (205), the supporting element (210) has a shoulder (260) which bears axially against the decoupling element (215).

6. The drive module (160) as claimed in claim 5, characterized in that, on a side which faces away from the fastening flange (205), the supporting element (210) carries a securing element (250) which bears axially against the decoupling element (215).

7. The drive module (160) as claimed in claim 6, characterized in that the stator (220) is enclosed by a rotor (400) of the drive motor.

8. The drive module (160) as claimed in claim 7, characterized in that the fastening flange (205) defines an outer contour of the drive module (160) in a radial direction.

9. The drive module (160) as claimed in claim 1, characterized in that the decoupling element (215) is configured as a hollow, elastic cylinder which comprises a radial inner face which is in engagement with the supporting element (210) and a radial outer face which is in engagement with the stator (220).

10. The drive module (160) as claimed in claim 9, wherein the decoupling element is in the form of an elongate sleeve.

11. The drive module (160) as claimed in claim 1, characterized in that the stator (220) comprises a first (225) and a second holder (230), the decoupling element (215) being fastened in a positively locking manner between the two holders (225, 230).

12. The drive module (160) as claimed in claim 11, wherein the holders (225, 230) bear in a radial direction against the decoupling element (215).

13. The drive module (160) as claimed in claim 1, characterized in that, on a side which faces the fastening flange (205), the supporting element (210) has a shoulder (260) which bears axially against the decoupling element (215).

14. The drive module (160) as claimed in claim 1, characterized in that, on a side which faces away from the fastening flange (205), the supporting element (210) carries a securing element (250) which bears axially against the decoupling element (215).

15. The drive module (160) as claimed in claim 14, wherein the securing elements (250) are self-locking securing rings.

16. The drive module (160) as claimed in claim 14, wherein a first flux element (235) is disposed between a first holder (225) and a second holder (230), and wherein the decoupling element (215) and the first flux element (235) are both delimited axially on opposing sides by the two holders (225) and (230).

17. The drive module (160) as claimed in claim 14, wherein a lower rotary bearing (240) and an upper rotary bearing (245) are connected in a rotationally stable manner to a first holder (225) and a second holder (230).

18. The drive module (160) as claimed in claim 14, wherein the drive module (160) includes four elastic decoupling elements (215).

19. The drive module (160) as claimed in claim 14, where an end section of the supporting element (210) is shaped conically.

20. The drive module (160) as claimed in claim 14, wherein the supporting element (210) is in one piece with fastening flange (205).

21. The drive module (160) as claimed in claim 1, characterized in that the stator (220) is enclosed by a rotor (400) of the drive motor.

22. A fan module (130) having a drive module (160) as claimed in claim 21, characterized by a fan wheel (150) which is connected to the rotor.

23. A motor vehicle, comprising a fan system (120, 130, 140) having a fan module (130) as claimed in claim 22.

24. The drive module (160) as claimed in claim 1, characterized in that the fastening flange (205) defines an outer contour of the drive module (160) in a radial direction.

25. The drive module (160) as claimed in claim 1, wherein the at least one vibration-damping decoupling element (215)

includes a plurality of vibration-damping decoupling elements (215) that engage with the plurality of supporting elements (210).

* * * * *